United States Patent Office 2,813,891
Patented Nov. 19, 1957

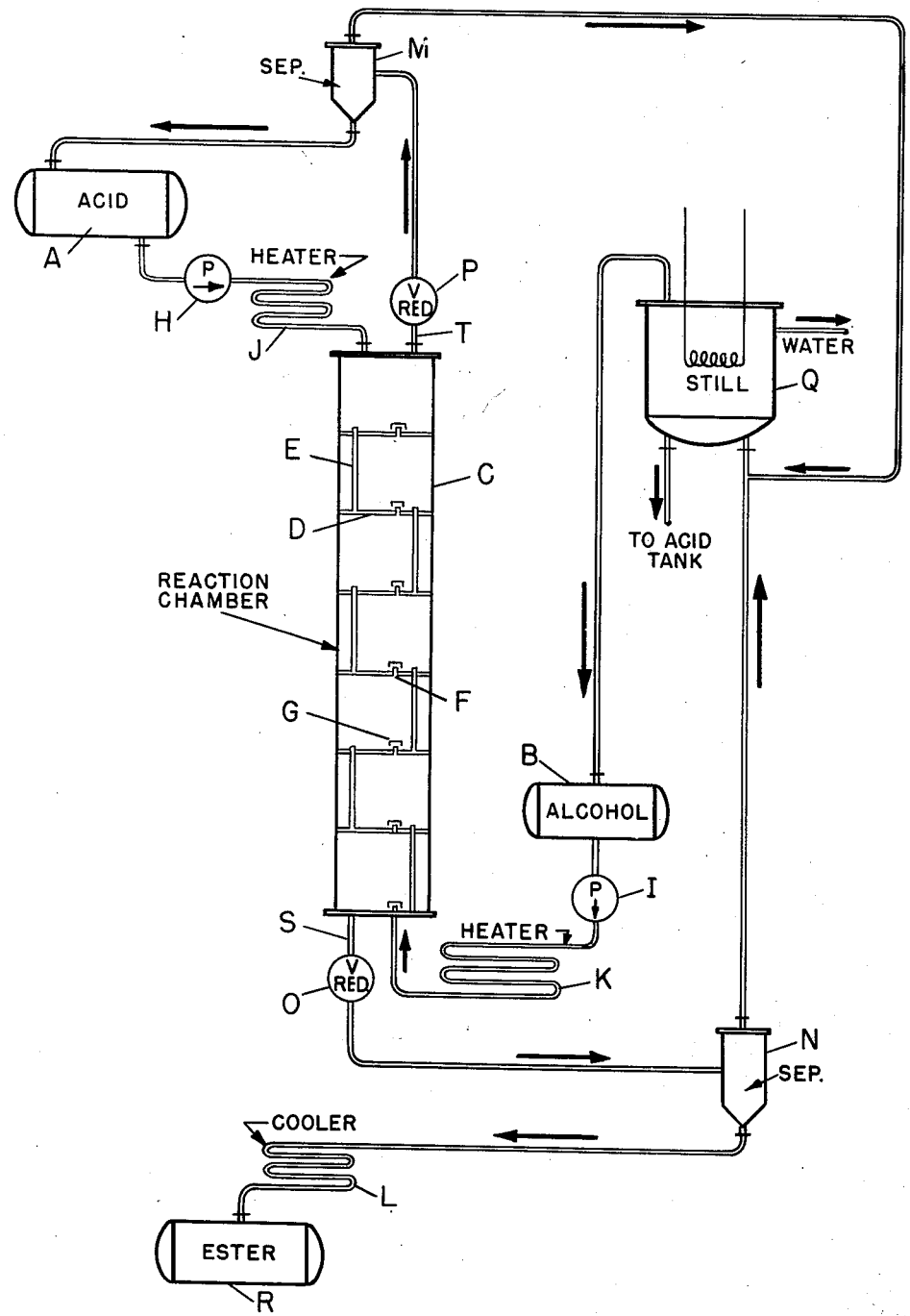

2,813,891

ESTERIFICATION OF AROMATIC CARBOXYLIC ACIDS

Wyly M. Billing, Wilmington, Del., assignor to Hercules Powder Company, Wilmington, Del., a corporation of Delaware Application February 4, 1954, Serial No. 408,215

13 Claims. (Cl. 260—475)

This invention relates to a method for the continuous production of esters of aromatic carboxylic acids with lower aliphatic alcohols.

The known methods for the preparation of esters of aromatic carboxylic acids with lower aliphatic alcohols have been time consuming, costly, and relatively inefficient from the viewpoint of yields. Recently, a process has been described in U. S. 2,459,014 to Cavanaugh and Lufkin for the manufacture of dialkyl esters of terephthalic acid which avoids some of the obstacles of the old processes. The process of Cavanaugh and Lufkin calls for carrying out the esterification at an elevated temperature under pressure and in the presence of large amounts of a strongly acidic catalyst. As a result, they are able to obtain increased yields in a greatly reduced time. However, the process suffers from two serious drawbacks. First, their process requires large amounts of a very strongly acidic catalyst, sulfuric acid being preferred. Thus, from 1 to 10 parts by weight of 100% sulfuric acid are required for every one part of terephthalic acid esterified. Even under ordinary temperatures and pressures, such a reaction mixture would be corrosive, and under the elevated temperatures and pressures used by Cavanaugh and Lufkin, the problem is multiplied manyfold. The second drawback is that this process, in common with the prior art processes, requires a large excess of alcohol compared to acid. Thus, in the case of methanol, Cavanaugh and Lufkin require from 15 to 20 parts by weight of methanol to one part by weight of terephthalic acid.

I have now found that the disadvantages of the prior art methods are overcome by reacting the aromatic carboxylic acid and the lower aliphatic alcohol in a flooded column in countercurrent flow, the alcohol being substantially anhydrous. The column is maintained at a pressure of up to about 1000 p. s. i. and at a temperature sufficient to cause esterification. The temperature and pressure are interrelated so that the alcohol is maintained above its boiling point, i. e., in the vapor state, while still retaining a portion of the vapor dissolved in the liquid phase, the liquid phase containing the acid.

Generally, the ratio of alcohol to acid is not critical. In the case of a monocarboxylic acid, such as p-toluic acid, when methanol is used as the alcohol, about two moles of methanol to one mole of acid will be sufficient, while in the case of a dicarboxylic acid such as terephthalic acid or isophthalic acid, about four moles of methanol to one mole of acid will be sufficient. Thus, in the case of methanol and terephthalic acid, when figured on a weight basis as in U. S. 2,459,014, only about one part of methanol for one part of acid is needed. The maximum amount of alcohol is dictated only by commercial convenience. In general, the rate of input of the alcohol and acid should be sufficient to flood the column as indicated by excess alcohol emerging from the top of the column. The use of sufficient alcohol to emerge from the top of the column also serves the essential function of entraining the water formed in the reaction. The temperature will generally vary from about 180° C. up to the temperature at which decomposition of the reactants or products occurs, generally about 350° C. It is preferred to use a pressure of from about 50 p. s. i. to about 1000 p. s. i. It is most preferred to use a pressure of from about 200 p. s. i. to about 600 p. s. i.

In the practical adaptation of this invention, the conditions under which the esterification is brought about and, more especially, the temperature and pressure conditions will vary with the various alcohols and acids. The time required for the reaction will vary widely depending upon the temperature, pressure, the acid, the alcohol, etc., but it is generally within the range of about 5 minutes to about 2 hours.

Having indicated in a general way the nature and purpose of this invention, the practical carrying out of the method will be exemplified in connection with the description of the apparatus which may be used for practicing the invention and is illustrated in the accompanying drawing in which the single figure is a diagrammatical illustration of the preferred form of apparatus. It is understood that this description is given by way of illustration only and is not to be taken as limiting in any way.

Referring to the drawing, C indicates a reaction chamber which comprises, for example, a cylindrical tower divided into sections horizontally by means of plates D, the sections being connected by means of downtake pipes E and by means of uptake pipes F provided with bubble caps G. A plurality of towers in series may be provided if desired.

In carrying out the method in accordance with this invention with the use of the apparatus shown in the drawing, the container A is charged with the acid either in a molten state or in a suitable liquid carrier and the container B is charged with essentially anhydrous alcohol. The heaters J and K are heated by any suitable means as, for example, by heated fluid contained in jackets about the heaters or in any other suitable manner, and the cooler L is suitably cooled as, for example, by passage of cooling fluid through a jacket around the cooler. The pumps H and I are started and operate respectively to force acid through the heater J and alcohol through the heater K countercurrently into the reaction chamber C. The acid passes downwardly in liquid phase through the tower from section to section, while the alcohol passes upwardly in vapor phase from section to section and is caused to bubble through the molten acid into several sections successively by the bubble caps G. The temperature of the acid and alcohol may be and is desirably maintained in the reaction chamber by any suitable heating thereof as, for example, by passing a heated fluid through a jacket about the reaction chamber.

The heated molten acid and the alcohol vapor are thoroughly and efficiently contacted in the reaction chamber, it being noted that the strongest alcohol vapor entering at the bottom of the tower contacts with the weakest acid, i. e., acid containing a large amount of ester, while the strongest acid entering the top of the tower contacts with the weakest alcohol, i. e., alcohol diluted by water evolved in the reaction. By virtue of contacting the strongest alcohol with the weakest acid, coupled with continuous removal of the water through entrainment in the alcohol vapor and removal therewith in the alcohol overflow at the top of the column, decomposition and hydrolysis of the ester product are largely avoided. It is therefore essential that the alcohol input be sufficient to overflow the top of the column and be essentially anhydrous.

This excess alcohol passes from the reaction chamber C through the pipe T into a reducing valve P whence it is led to a separator as, for instance, a centrifugal separator M, wherein the higher boiling constituents consisting mainly of unreacted acid are separated therefrom and returned to the acid container A, while the lower boiling components, such as alcohol and water, are passed into still Q. Ester product leaves the bottom of the reaction chamber C through pipe S and passes through a reducing valve O into a separator N which may be a centrifugal separator wherein the high boiling ester is separated from the lower boiling components which are mainly the alcohol. The ester is passed from the separator N through the cooler L into the ester container R. The lower boiling constituents are passed into the still Q along with the overflow alcohol from the pipe T.

In the still the alcohol is separated from the other constituents and is passed into the alcohol tank B. The water present is separated and passed to waste, while the organic still bottoms which contain unreacted acid are drawn off and sent to the acid container A.

It will now be observed by virtue of the counterflow of acid and alcohol in the reaction chamber a highly efficient and thorough contact between the alcohol and acid is obtained. At the same time, by virtue of the contacting of the strongest alcohol with the weakest acid, decomposition or hydrolysis of the ester product is largely avoided. Decomposition of acid is largely avoided, since by virtue of the counterflow and consequent efficient contact between the alcohol and acid, the reaction between the acid and alcohol is effected in a minimum of time and hence the acid is subjected to the relatively high temperature of reaction for a minimum time. Due to the counterflow and consequent efficiency of time, a minimum excess of alcohol is required. Furthermore, with the overflow of alcohol, which is essential for this process, the efficiency of the reaction is considerably improved and a product of greatly reduced acid number is obtained. The overflow of alcohol insures that the water formed in the esterification is removed almost as rapidly as it is formed in the reaction. Thus, hydrolysis of the ester product is reduced. Furthermore, by having a sufficient amount of alcohol available in every stage of the reaction chamber, a more rapid and thorough esterification is made possible.

The following examples are illustrative of the carrying out of the method embodying this invention for use in the apparatus illustrated and described and are presented by way of illustrating and not by way of limiting the invention. In the production of methyl p-toluate, the reaction between the p-toluic acid and methanol was effected in the apparatus described at a temperature of about 240° C. and under a pressure maintained in the reaction chamber of about 400 p. s. i. g. The methanol and toluic acid were introduced countercurrently at the rate of 100 parts by weight of methanol and 136 parts by weight of toluic acid per 1.5 hours, thereby giving a residence time in the reaction chamber of about 1.5 hours. The product so obtained was methyl p-toluate of extremely high purity, the product having an acid number of about 3.

As a further example of the method of carrying out this invention for the production, for example, of the methyl esters of mixed phthalic acids, the reaction was carried out in the apparatus described at a temperature of about 250° C. and under a pressure maintained in the reaction chamber of about 500 p. s. i. g. The methanol and a mixed phthalic acid consisting of about 70% isophthalic acid and about 30% terephthalic acid were charged to the reaction chamber countercurrently at the rate of about 190 parts by weight of methanol and about 166 parts of the mixed phthalic acids per 2 hours, thereby giving a residence time in the chamber of about 2 hours. The mixed phthalic acid was introduced to the chamber in the form of a slurry of the mixed phthalic acids in molten methyl toluate (the methyl toluate being the methyl ester of a mixture of about 70% m-toluic acid and about 30% p-toluic acid). By this means there was obtained the dimethyl ester of mixed phthalic acids of exceptionally high purity, the product so obtained having an acid number of about 5 to 7.

By lower aliphatic alcohol as used herein is meant the monohydric aliphatic alcohols having ten or less carbon atoms as, for example, methanol, ethanol, and the various isomeric propanols, butanols, pentanols, hexanols, heptanols, octanols, nonanols, and decanols, or the monoethers of glycols, such as the monomethyl ether of ethylene glycol, the monoethyl ether of ethylene glycol, the monomethyl ether of propylene glycol, etc.

The aromatic carboxylic acids used have the general formula:

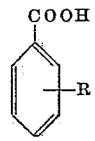

where R is carboxy, a carboxy group esterified with a lower aliphatic alcohol, or an alkyl group having no more than four carbon atoms. However, it is preferred to use a toluic acid, a phthalic acid or a half ester of a phthalic acid. The toluic, phthalic and other acids may, of course, be substituted in the aromatic nucleus by various groups which contain no carbon atoms, such as halogen and hydroxyl groups. When the aromatic nucleus has a hydroxyl substituent, a larger amount of alcohol should be used than would otherwise be the case.

Some of these acids are difficult to impossible to liquefy. Such acids are charged to the reaction chamber in the form of a solution or slurry in a liquid carrier (i. e., liquid under the esterification conditions). The liquid carrier must be able to dissolve a portion of the alcohol and must not be decomposed under the conditions of the esterification reaction. Any compound having these properties is a suitable liquid carrier. A most suitable liquid carrier is an ester of an aromatic carboxylic acid as shown in the example above. Another suitable carrier is another aromatic carboxylic acid which is molten under the reaction conditions. The liquid carrier should be chosen so as to be easily separated from the product, though in those cases where the carrier is a desired component of the product, this is not necessary. Thus, where an ester is used as the liquid carrier the alkyl portion of the ester should be the same as that on the alcohol used in the esterification because of transesterification, unless a mixed ester is desired. A variation of using an ester as the liquid carrier is to charge the acid work tank (A in the drawing) with both the difficultly liquefiable aromatic carboxylic acid and a portion of the alcohol feed. When the acid work tank is subjected to heat and pressure to permit injection of the acid feed into the reaction chamber, some esterification occurs in the work tank. There is then formed a mixture of molten ester and/or partial ester, depending on the acid used, with dissolved alcohol and acid, the remaining acid, if any, being slurried in this mixture. A particularly desirable ester to use as a liquid carrier is the ester which it is desired to produce in those cases where the melting point of the ester is satisfactory.

While, as stated above, the maximum amount of alcohol relative to acid which may be used is dictated solely by commercial convenience, in general it has been found commercially practicable to use from about 2 to 10 moles of alcohol per mole of monocarboxylic acid and from about 4 to about 20 moles of alcohol for a phthalic acid. The esterification may be carried out with pure acids and alcohols or with mixtures of the acids and alcohols.

It will be understood that as some acid is carried out through outlet pipe T the input of acid must be slightly greater than that taken off in the ester product. Further, it should be understood that alcohol charged to the reaction chamber should be essentially anhydrous, i. e., it should contain less than about 0.5% by weight of water.

It will be understood that the apparatus embodying this invention as illustrated and described in the modus operandi and the method embodying this invention as described may be widely varied without departing from the invention. That is to say, the details of the apparatus may be widely varied and the factors of pressure, time, temperature, etc., may be widely varied without departing from the invention which, in essence, contemplates effecting the esterification of aromatic carboxylic acids in counterflow condition with sufficient alcohol to flood the reaction chamber and overflow the top of the chamber, the alcohol input being essentially anhydrous.

This invention is particularly advantageous when used to esterify monoesters of phthalic acids prepared in accordance with the process disclosed in U. S. 2,653,165. For example, when methyl p-toluate is oxidized to form the monomethyl ester of terephthalic acid, substantial amounts of undesired high molecular weight compounds are formed in the oxidation mixture. However, when the oxidate containing the undesired high molecular weight compounds is subjected to the noncatalytic esterification at elevated pressure described herein, these compounds react to form dimethyl terephthalate, thereby significantly increasing the yield amount of dimethyl terephthalate product obtained over what would be expected from the amounts of monomethyl terephthalate and terephthalic acid in the feedstock to the esterification reaction chamber.

I claim:
1. The method for the continuous production of aromatic carboxylic acid esters which includes passing in liquid phase an aromatic carboxylic acid having the general formula

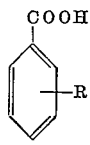

where R is selected from the group consisting of carboxy, a carboxy group esterified with a lower aliphatic alcohol and alkyl groups having no more than 4 carbon atoms and a vaporized substantially anhydrous lower aliphatic alcohol countercurrently through a column, said acid being passed downwardly through the column and said alcohol being passed upwardly through the column, the rate of input being sufficient to flood the said column as indicated by excess alcohol and a portion of said acid overflowing the top thereof, said column being maintained under a pressure of 200–600 p. s. i. and at a temperature within the range of 180–350° C., the temperature and pressure being interrelated so as to maintain the alcohol above its boiling point while still retaining a portion of the alcohol dissolved in the liquid phase, and withdrawing product ester containing alcohol from the bottom of said column.

2. The process according to claim 1 wherein the aromatic carboxylic acid is a toluic acid.

3. The process according to claim 1 wherein the aromatic carboxylic acid is a phthalic acid.

4. The process according to claim 1 wherein the aromatic carboxylic acid is a half ester of a phthalic acid.

5. The process according to claim 2 wherein the lower aliphatic alcohol is methanol.

6. The process according to claim 2 wherein the lower aliphatic alcohol is ethanol.

7. The process according to claim 2 wherein the lower aliphatic alcohol is propanol.

8. The process according to claim 3 wherein the lower aliphatic alcohol is methanol.

9. The process according to claim 4 wherein the lower aliphatic alcohol is methanol.

10. The method for the continuous production of dimethyl terephthalate which includes passing in liquid phase an aromatic carboxylic acid selected from the group consisting of terephthalic acid, a half ester of terephthalic acid and mixtures of terephthalic acid and half esters of terephthalic acid and vaporized substantially anhydrous methanol countercurrently through a column, said acid being passed downwardly through the column and said alcohol being passed upwardly through the column, the rate of feed being sufficient to flood the said column and cause excess methanol and a portion of said acid to overflow the top thereof, the said column being maintained at a pressure of from about 50 to about 1000 p. s. i. and at a temperature of from about 180° to about 350° C., the temperature and pressure being interrelated so that the methanol is maintained above its boiling point while retaining a portion of the methanol vapor dissolved in the liquid phase, and withdrawing product ester containing alcohol from the bottom of said column.

11. The method for the continuous production of dimethyl isophthalate which includes passing in liquid phase an aromatic carboxylic acid selected from the group consisting of isophthalic acid, a half ester of isophthalic acid and mixtures of isophthalic acid and half esters of isophthalic acid and vaporized substantially anhydrous methanol countercurrently through a column, said acid being passed downwardly through the column and said alcohol being passed upwardly through the column, the rate of feed being sufficient to flood said column and cause excess methanol and a portion of said acid to overflow the top thereof, said column being maintained at a pressure of from about 50 to about 1000 p. s. i. and at a temperature of from about 180° C. to about 350° C., the temperature and pressure being interrelated so that the methanol is maintained above its boiling point while retaining a portion of the methanol vapor dissolved in the liquid phase, and withdrawing product ester containing alcohol from the bottom of said column.

12. The process according to claim 1 wherein the aromatic carboxylic acid is passed through the column in a liquid carrier.

13. The process of claim 10 wherein the aromatic carboxylic acid is passed through the column in a liquid carrier.

References Cited in the file of this patent
UNITED STATES PATENTS

| | | |
|---|---|---|
| 2,479,066 | Gresham | Aug. 16, 1949 |
| 2,578,312 | Miller | Dec. 11, 1951 |
| 2,644,009 | Cash et al. | June 30, 1953 |